(12) United States Patent
Nardiello et al.

(10) Patent No.: US 9,962,956 B2
(45) Date of Patent: May 8, 2018

(54) SYSTEM AND METHOD FOR ONBOARD DATA TRACKING

(71) Applicant: Northrop Grumman Systems Corporation, Falls Church, VA (US)

(72) Inventors: Jerrell A. Nardiello, Hicksville, NY (US); Robert J. Christ, Brentwood, NY (US); John S. Madsen, Commack, NY (US); Elias L. Anagnostou, Merrick, NY (US); Stephen J. Engel, East Northport, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 26 days.

(21) Appl. No.: 14/933,183

(22) Filed: Nov. 5, 2015

(65) Prior Publication Data

US 2017/0129254 A1 May 11, 2017

(51) Int. Cl.
*G06F 17/30* (2006.01)
*B41J 3/407* (2006.01)

(52) U.S. Cl.
CPC .................................. *B41J 3/4073* (2013.01)

(58) Field of Classification Search
None
See application file for complete search history.

(56) References Cited

U.S. PATENT DOCUMENTS

| | | | |
|---|---|---|---|
| 5,907,144 A | 5/1999 | Poon et al. | |
| 6,338,433 B1 | 1/2002 | Drexler | |
| 6,556,273 B1 * | 4/2003 | Wheeler | G03B 17/24 352/92 |
| 8,069,782 B2 | 12/2011 | Fragala et al. | |
| 8,121,386 B2 | 2/2012 | Rancien | |
| 2008/0190561 A1 * | 8/2008 | Sanbongi | B32B 37/1207 156/361 |
| 2010/0078480 A1 * | 4/2010 | Aker | G06K 19/06009 235/462.08 |
| 2013/0025344 A1 | 1/2013 | Haussmann et al. | |
| 2014/0054386 A1 * | 2/2014 | McKinnon | G06Q 30/0601 235/494 |
| 2014/0339312 A1 * | 11/2014 | Simske | G06K 19/06037 235/462.04 |

(Continued)

OTHER PUBLICATIONS

Nowakowski, S.E. et al; A flexible system to capture sample vials in a storage box—the box vial scanner; Engineering in Medicine and Biology Society, 2009. EMBS 2009. 31st Annual International Conference of the IEEE EMBS, pp. 1718-1721; Sep. 3-6, 2009.

(Continued)

*Primary Examiner* — Alejandro Valencia
(74) *Attorney, Agent, or Firm* — Patti & Malvone Law Group, LLC

(57) ABSTRACT

A method and apparatus for embedding critical data directly onboard a physical asset is disclosed. Since the critical data and the asset are never separated, accurate and timely data pertinent to the asset travels with it, and may be written, read, and updated. Accurate data collection ensures a digital model/twin of the asset reflects the true physical state of the asset. Data is embedding optically or magnetically and may be read or rewritten so that information about the life/usage of the asset is continually available, right up to the current state.

6 Claims, 2 Drawing Sheets

(56) References Cited

U.S. PATENT DOCUMENTS

2014/0361074 A1* 12/2014 Kumar .............. G06F 17/30011
                                                        235/376
2015/0081335 A1   3/2015 Dixon et al.

OTHER PUBLICATIONS

Babu, H.U. et al; Anti-counterfeiting using reflective micro structures—Based on random positioning of microstructures; Advances in Optoelectronics and Micro/Nano-Optics (AOM), 2010 OSA-IEEE-COS, 5 Pages; Dec. 2010.

Bohn, J. et al; Super-distributed RFID Tag Infrastructures; Ambient Intelligence, Lecture Notes in Computer Science, vol. 3295, 2004, pp. 1-12.

Ueoka, R. et al; RFID Textile and Map Making System for Large Area Positioning; Wearable Computers, 2009; ISWC '09; International Symposium on, pp. 41-44; Sep. 4-7, 2009.

* cited by examiner

SYSTEM AND METHOD FOR ONBOARD
DATA TRACKING

BACKGROUND

The invention relates generally to smart manufacturing and more particularly to creating digital surrogates of a product during design, manufacturing and life-cycle use of the product.

The term "smart manufacturing" is generally understood to encompass a wide variety of model based engineering, system engineering and manufacturing technologies that characterization the digitization of manufacturing. This is also known as "digital thread" which provides for cradle to grave planning, design, manufacturing, monitoring, and maintenance of assets such as aircraft, spacecraft, land and sea vehicles, etc. Data is collected throughout the lifecycle of an asset, including design, manufacturing process and usage to create a "digital twin" of an asset. A digital twin can also be created for older legacy assets after manufacturing is complete. Another term for "digital twin" is "life cycle model."

Typically, when manufacturing a complex asset such as an aircraft, for example, many experts in a wide variety of disciplines contribute to the end result. Providing a format and method of collecting and managing the data models and information generated by the different experts so that it is widely usable is critical to the overall success of smart manufacturing. Currently, there are problems with effective communication between designers and manufacturers of an asset, for example, and between manufacturers and inspectors as another example. Although ID tagging using, for example, two-dimensional bar codes or RFID tags, is known in the prior art, they are typically not miniaturized and are only employed at only a single discrete location on an asset.

In addition, prior art ID tags typically only include a part number or other identification. While the part number may be associated with data generated about the part, for example repairs or usage, the data itself is typically stored by users in a separate computer system or even on paper. Over the life cycle of a part or complete asset, the data may be stored in different locations or incompatible computer systems/software, thus becoming inaccessible to subsequent users.

Thus, a need exists for accurate and timely data pertinent to the asset to be collected and maintained in a way that is accessible to everyone working on the asset. There is also a need for distributed tags that provide complete information about individual parts of an asset even when only a portion of the part is available.

SUMMARY

In an embodiment, the invention is a method and apparatus for embedding critical data directly onboard the asset, such that the two are never separated. This allows for accurate and timely data pertinent to the asset to travel with it, and to be written, read, and updated. Accurate data collection ensures the digital model/twin of the asset reflects the true physical state of the asset. The invention parallels the function of DNA (deoxyribonucleic acid) in biological beings, in that it will allow the user to understand the genesis, and lineage of the asset, but will go one step further beyond biological DNA, and will include information about the life/usage of the asset, right up to the current state.

The invention in one implementation encompasses an method of encoding information on an object including the steps of generating a two dimensional (2D) code representing information about the object; printing a plurality of redundant copies of the 2D code on the entire surface of the object; and updating the 2D codes on the surface of the object when changes are made to the object.

In another embodiment, the invention encompasses a system for digitally simulating a physical object having a plurality of components, including a computer processing device for generating and storing a life cycle model of the physical object; a plurality of two dimensional (2D) codes, each 2D code representing information about a component of the physical object; a printing device for embedding redundant copies of each 2D code on the entire surface of the component associated with the 2D code; and a reading device for reading one or more 2D codes on the physical object and adding the information from the 2D code to the life cycle model.

In either of the above embodiments, the redundant copies of the 2D code have a length and width of less than an inch.

In a further embodiment, the redundant copies of the 2D code are optically printed on the surface of the object.

In any of the above embodiments, the surface of the object is coated with a photo-sensitive emulsion prior to exposing the surface of the object to a projected pattern of the 2D code.

In any of the above embodiments, the 2D codes are printed on separate carriers, mixed into a paintable coating and applied to the surface of the part.

In any of the above embodiments, the copies of the 2D code are magnetically encoded on the surface of the object by coating the surface of the object with a magnetic medium and writing the copies of the 2D code onto the surface of the object using a magnetoresistive (MR) head.

In any of the above embodiments, the 2D codes are optically or magnetically read and added to the life cycle model or updated with new information.

DESCRIPTION OF THE DRAWINGS

Features of example implementations of the invention will become apparent from the description, the claims, and the accompanying drawings in which:

DETAILED DESCRIPTION

The "digital thread" is an extensible, configurable enterprise-level framework, or life cycle model, that seamlessly expedites the controlled interplay of data, information, and knowledge among design, manufacturing, operations, and sustainment disciplines that informs decisions throughout a system's life cycle. The "digital twin" is a virtual idealization (surrogate model) of an individual physical asset (i.e. aircraft) codified as a collection of computer models and data that accurately capture its behavioral responses at multiple spatial and temporal scales. When used to process "as built", "as flown", "as maintained" and health data as experienced by its physical counterpart, the digital twin faithfully mimics the health state and system response of the real vehicle. The virtual fleet of digital twins and the engineering community that creates, interacts with and maintains them are connected together by the digital thread.

A critical factor in the creation of a digital twin of a physical asset is collecting data from the physical asset and processing it into the digital twin. In an embodiment, the invention comprises Digital Nomenclature Appliques, or DNA, that provides for embedding critical data directly on the physical asset in a digitally readable and writable way. A representation of the relationship between the virtual and physical assets and the use of digital DNA to connect the two is shown in FIG. 1.

Although specific steps and processes are described below, one of ordinary skill in the art would understand that the design of an asset and manufacture of a complex asset such as an aircraft is very individualized. There could be many variations within the following steps, depending on technology available, resources, contract requirements or company policies, for example.

Figure 1:
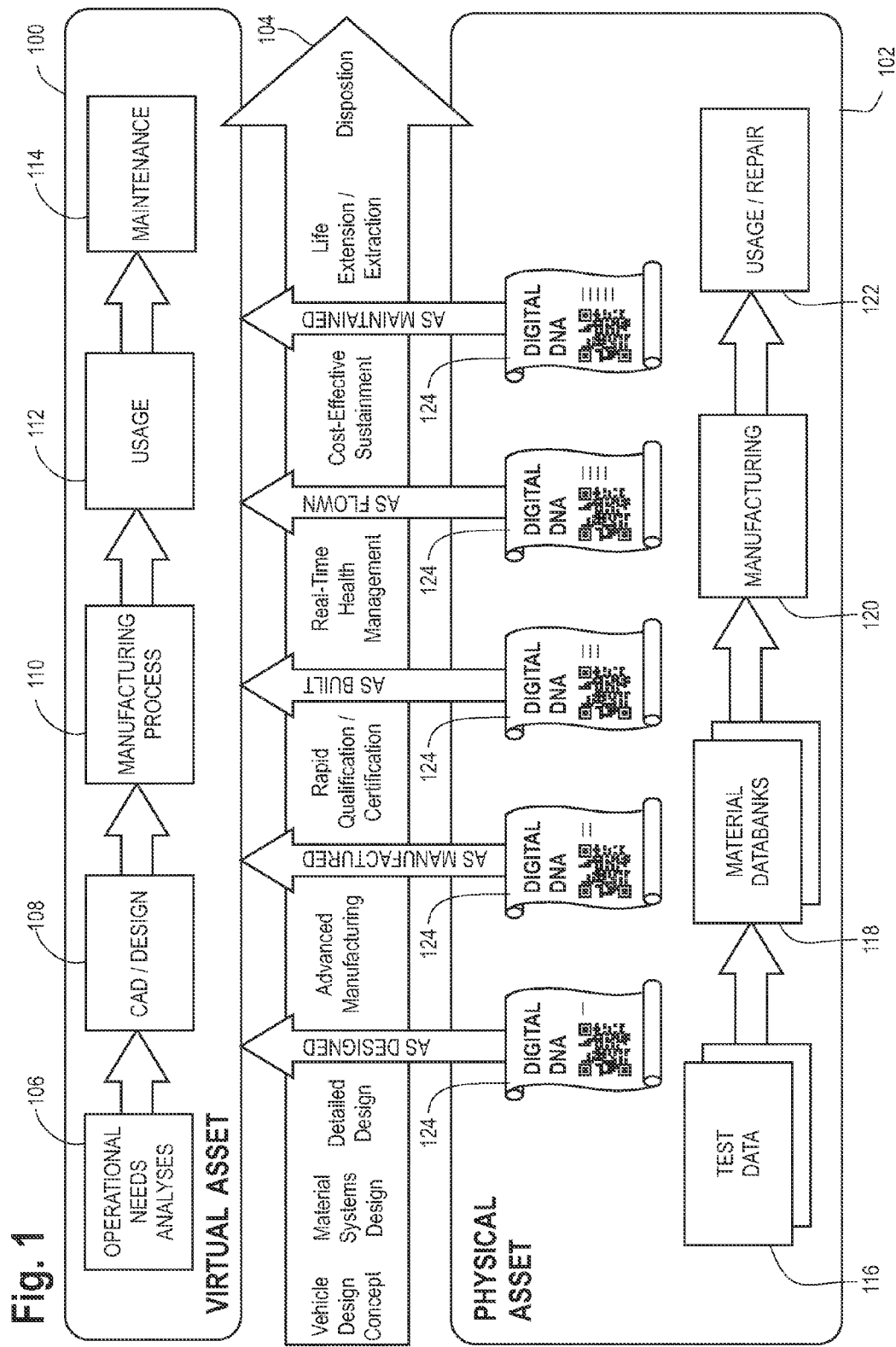
FIG. 1 is a representation of the process of transferring information between virtual digital twins and physical assets according to the present invention.

The lower half of FIG. 1 represents a physical asset 102, particularly a complex asset such as an aircraft that requires extensive design and coordination among a team of workers. Step 116 represents the large volume of test data that is generated in support of a vehicle design, including structural test, chemical testing, etc. Tests start out at the small-scale coupon level, and progress to subcomponents, components, and full-scale aircraft testing. Depending on the asset, thousands of tests may be conducted during design and manufacture. In addition to, for example, verifying performance of a designed product or component, data from the tests is also used to generate one or more material databases in step 118. The one or more material databases become the authorized set of material properties that are used by both design and manufacturing engineering for their calculations and analysis. It is also the metric against which all incoming material verification tests are measured before they are allowed to be used on the vehicle. In step 120, additional feedback data from the actual manufacturing of the various detail parts and assemblies is generated. It includes such information as actual part measurements (as opposed to the theoretical design size), tolerance variances, substitutions, discrepancy reports, etc. Finally step 122 of FIG. 1 represents data generated during use of the physical asset, including flight recorder data, maintenance records, redesigns and part replacement, for example.

The upper half of FIG. 1 depicts a virtual asset 100, or digital twin, comprised of digital surrogate models, processes, knowledge, engineering disciplines and simulation environments that are tied together by the digital thread infrastructure.

In parallel with the lower half of FIG. 1, the virtual process starts with an operational needs analysis step 106. This is where the mission parameters are defined, for example, flight envelope, weight, range, payloads, etc. These parameters will be run through trade study models to arrive at general design guidelines. In step 108, these guidelines will be used to generate design models in various computer aided design (CAD) and Finite Element Analysis (FEA) systems to build a virtual vehicle. The virtual vehicle is run through structural, mechanical, vibrations, etc. analyses to produce a final design which is then captured in a CAD model. The CAD model becomes the master document that governs the manufacturing of the vehicle, and will be used to generate subsequent manufacturing CAD models (for tool and fixture designs), and well as manufacturing process models. In step 110, manufacturing process models are used to govern the methods and procedures used in creating the detail components and assemblies. They will dictate processes such chemical treatments, finishes, hole drilling, etc., and the interaction of these processes throughout the manufacturing and use of the vehicle.

Following the manufacture of an asset, the asset begins the usage portion of its life cycle in step 112. Every physical vehicle will have some sort of data acquisition "black box" system on board which will record parameters such as speed, elevation, "G" levels of maneuvers, stresses and strains, temperature, etc. This data is also added to the digital twin and used to "fly" virtual digital twins in the same exact manner as their real world counterparts, then analyzed to ascertain the structural "health" and make decisions about future use, retirement, maintenance, etc of the corresponding physical asset. Generally, structural health refers to fatigue damage, which is the development of microscopic cracks due to repeated cyclic loading of a part that may link up over time into larger and larger cracks, and can ultimately lead to component failure. Although, structural health more broadly includes additional factors such as corrosion, surface coating failure, over loading damage, etc. The maintenance step 114 also captures data and adds it to a maintenance model to strike a balance of usage profiles that minimizes wear and tear/damage to the vehicle, and allows maximum use and minimum cost. In this way the digital twins of each vehicle will live a virtual life identically to their physical counterparts, and allow fleet managers to make informed decisions about all aspects of the physical vehicles.

Life cycle arrow 104 depicts various engineering phases throughout the life cycle beginning with conceptual design and ending with the final retirement/disposition of the asset. As shown, the virtual world remains in step with the physical world as the cycle progresses. Digital DNA 124 is taken from the physical asset and added to the digital twin at every stage of the life cycle of the asset. As noted above, a digital twin can also be created for legacy assets.

Digital DNAs 124 are incorporated into individual parts, and enables instantaneous interrogation of the design, manufacturing and use pedigree of the individual parts of an asset as well as assemblies of parts. The unique aspect of this technology that rightly qualifies it as something similar to biological DNA, and distinguishes it from current technologies, is the fact that it will not employ isolated tags, located in just a few discrete places (typically as few as one), but it will employ appliqué tags distributed throughout the component in many places. In this way, no matter how small a piece of the part that is interrogated, its complete history will be accessible from on-board digital DNAs 124. In an embodiment, digital DNAs 124 are on the order of fractions of an inch down to microscopic sizes.

Figure 2A:
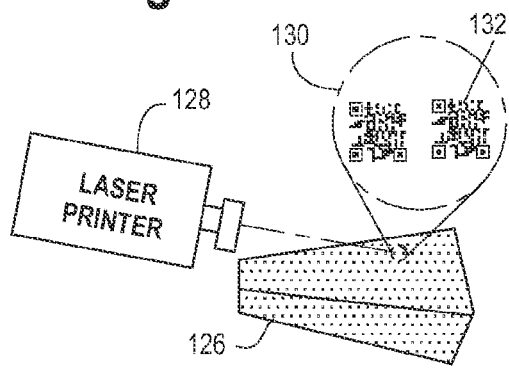
FIGS. 2A-2E are depict several mechanisms for optically and magnetically writing and reading digital DNA according to the present invention.

According the present invention, digital DNAs are applied repeatedly over the entire surface of a part being encoded. In a first embodiment, the surface of the part is coated with a photo-sensitive emulsion, much like a piece of photographic film, and exposed to a projected light pattern, or a laser projected pattern (not unlike that currently used to print CD-R disks), to imprint multiple digital DNAs throughout its surface. This embodiment is depicted in FIG. 2A. Part 126 represents any part of an asset to be encoded. Although a specific shape is shown, one of ordinary skill would understand that any type of part could receive the digital DNAs of the present invention. Part 126 is coated with a photo-sensitive emulsion, and then laser printer 128 is used to project a pattern of 2D digital DNAs 132, as shown in exploded view 130. Although a laser printer is depicted in FIG. 2A, any means of projecting an optical pattern could be used.

Figure 2B:
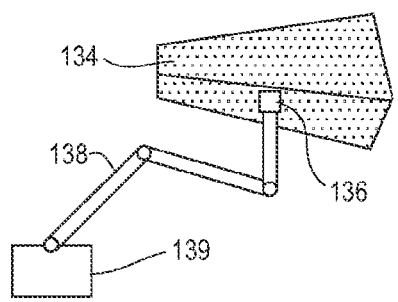

In a second embodiment, shown in FIG. 2B, the surface of the part 134 is coated with a magnetic media so that data is written onto the surface similarly to the process used to write data on computer hard disk drives using, for example, a magnetoresistive (MR) head 136 on an articulated arm 138 connected to controller 139. As explained above, the size and shape of part 134 is not restricted to the embodiment shown.

In either of these embodiments, the surface of part 120 or 130 may be painted over to conceal or embed the digital DNA, and provide any necessary protective or aesthetic qualities necessary for a particular application. Additionally, the part receiving digital DNAs may be a complicated 3D shape, but, since individual digital DNAs are on the order of fractions of an inch or smaller, they are applied to areas sufficiently small as to be effectively two-dimensional.

Figure 2C:
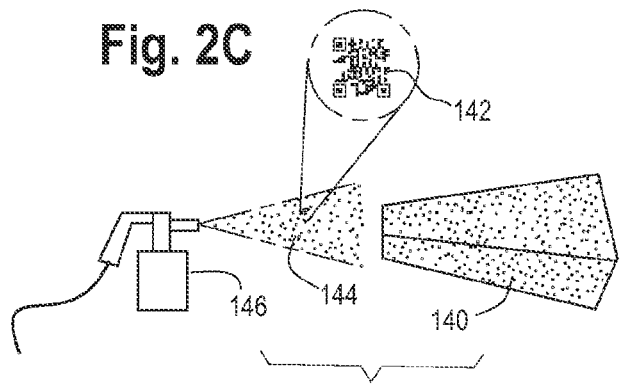

In yet another embodiment shown in FIG. 2C, digital DNAs 142 are printed onto separate carriers, for example, an ultra-thin Mylar, metallic, or non-metallic chip, much like confetti, mixed into a paintable coating 144 (similarly to "metal flake" automotive paints), and sprayed over the surface of part 140 using a paint spray gun 146. In this manner, the digital DNAs will be integral to the part's paint/coating system, and not require additional processing steps. The chips can be imprinted using either optical or magnetic technologies as explained above.

Figure 2D:
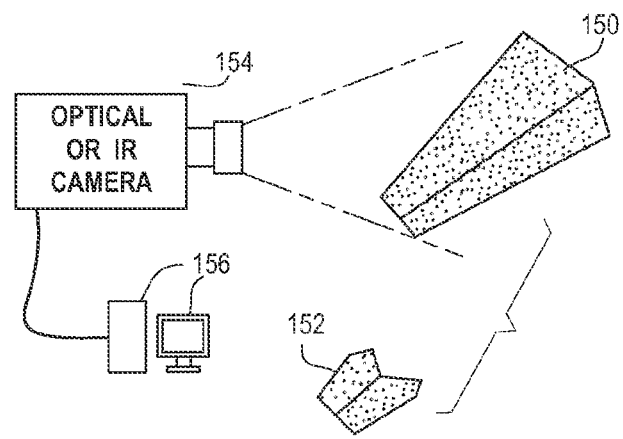

The method of reading the information contained in digital DNAs depends on the method using to write them. For the first embodiment shown in FIG. 2D, a digital DNA on either part 150 or a fragment 152 of part 150 is read using an optical or infrared (IR) camera 154. Camera 154 is coupled to a computer 156 to perform decoding of the digital DNAs read by camera 154. In embodiments where the digital DNAs have been painted over, a digital infrared camera is used to "see" through the paint to the underlying appliqués to capture the codes and deliver them to a computerized decoding system 156.

Figure 2E:
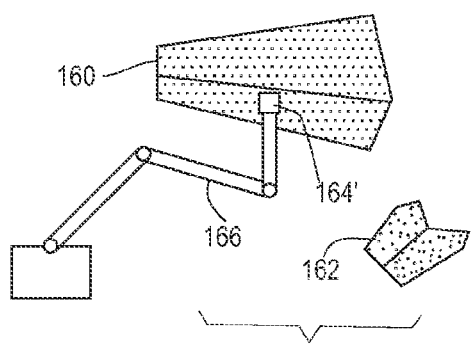

As shown in FIG. 2E, if digital DNAs are applied to a part 160 or fragment 162 thereof using the magnetic writing embodiment of FIG. 2B, they are read using a similar magnetic read head 164 that is also located on an articulated arm 166 or in a hand held device (not shown). The read and write heads can be in separate devices or combined in one device.

In any of the above embodiments, the digital DNAs store, at least, several kilobytes of data that is encoded on the part thousands, or millions, of times over its surface depending on factors such as camera and printer resolution, part shape, bar code size, etc. This quantity of data allows for the critical design, manufacturing, and usage parameters to easily be captured in a compact 2D design.

In a further embodiment, additional data is added to a part at any time during its lifecycle. For example, in the optical embodiment of FIG. 2A, additional digital DNAs are printed, or written and applied next to the existing digital DNAs, essentially appending data or adding it in parallel. In the rewriteable data chips of embodiments of FIGS. 2B and 2C, such that the new data is written onto the chips similarly to read/write CD disks, or an electrically addressable device like an electrically erasable read-only memory (EEROM).

Digital DNA technology has many possible applications, ranging from archiving pertinent data for identification, to properly direct repair procedures, part replication, anti-counterfeiting, accident scene reconstruction, etc.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A system for digitally simulating a physical object having a plurality of components wherein at least one component has a three dimensional (3D) shape with at least one three-dimensionally curved surface, comprising:
    a computer processing device for generating and storing a life cycle model of the physical object, said life cycle model comprising at least design, manufacturing and usage stages that form a digital simulation of the physical object;
    a plurality of two dimensional (2D) codes, each 2D code storing at least 2 kilobytes of data including design, manufacturing and usage data about a component of the physical object,
    a printing device for printing the 2D codes on separate carriers that are dispersed into a paintable coating,
    a painting device that applies the combined coating and carriers to the surface of the physical object by embedding redundant copies of each 2D code on the entire surface of each respective component of the physical object during different stages of a life cycle of the physical object,
    wherein each 2D code has a length and width of less than an inch so that each 2D code is substantially flat when applied to any location of the at least one component having the 3D shape, and
    a reading device for reading one or more 2D codes on each component of the physical object and adding the information from the 2D code to the life cycle model of the physical object to update the digital simulation.

2. The system of claim 1 wherein the printing device further comprises an laser printer and the reading device further comprises an optical or infrared (IR) camera.

3. The system of claim 2, wherein the laser printer projects a pattern of the plurality of 2D codes onto a surface of the object that has been coated with a photo-sensitive emulsion.

4. The system of claim 1 wherein the printing device further comprises a magnetoresistive (MR) head that magnetically encodes copies of the 2D code on the surface of the object.

5. The system of claim 4 wherein the surface of the object is coated with a magnetic medium.

6. The system of claim 5 wherein at least one of the 2D codes is updated by writing new information into the 2D codes using the MR head.

* * * * *